(12) United States Patent
Nakano et al.

(10) Patent No.: US 8,736,654 B2
(45) Date of Patent: May 27, 2014

(54) OPTICAL SCANNING DEVICE AND IMAGE FORMING APPARATUS INCLUDING THE SAME

(71) Applicant: Kyocera Document Solutions Inc., Osaka (JP)

(72) Inventors: Issei Nakano, Osaka (JP); Hiroaki Tsuchiya, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/754,648

(22) Filed: Jan. 30, 2013

(65) Prior Publication Data

US 2013/0222513 A1    Aug. 29, 2013

(30) Foreign Application Priority Data

Feb. 23, 2012 (JP) ................. 2012-037494

(51) Int. Cl.
  *B41J 15/14*   (2006.01)
  *B41J 27/00*   (2006.01)
(52) U.S. Cl.
  USPC .......................... 347/242; 347/257
(58) Field of Classification Search
  USPC ......... 347/229, 234, 235, 242, 245, 248, 250, 347/257, 263
  See application file for complete search history.

(56) References Cited

U.S. PATENT DOCUMENTS 4,977,412 A * 12/1990 Komori et al. ................ 347/257
2003/0025783 A1   2/2003 Mori

FOREIGN PATENT DOCUMENTS

| EP | 1085743 A1 | 3/2001 |
|---|---|---|
| JP | 01164919 A | 6/1989 |
| JP | 02-118612 A | 5/1990 |
| JP | 11-023987 A | 1/1999 |
| JP | 2004045808 A | 2/2004 |

\* cited by examiner

*Primary Examiner* — Hai C Pham
(74) *Attorney, Agent, or Firm* — Alleman Hall McCoy Russell & Tuttle LLP

(57) ABSTRACT

An optical scanning apparatus includes a reflecting mechanism, a light receiving element and a restricting mechanism. The reflecting mechanism reflects a light beam such that the irradiation point of the light beam moves in a predetermined scanning direction. The light receiving element is arranged in a movement plane defined by the light beam reflected by the reflecting mechanism, and the light receiving element outputs a light reception signal for adjusting the irradiation timing of the light beam in accordance with reception of the light beam reflected by the reflecting mechanism. The restricting mechanism positions the light receiving element relative to the movement plane.

6 Claims, 19 Drawing Sheets

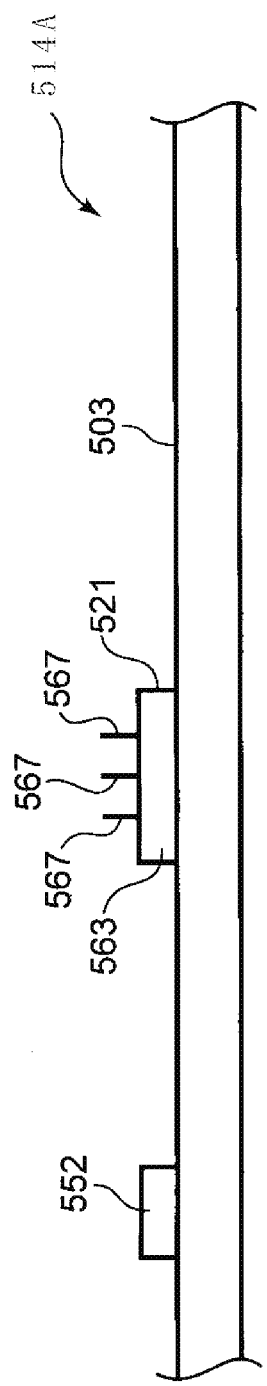

OPTICAL SCANNING DEVICE AND IMAGE FORMING APPARATUS INCLUDING THE SAME

INCORPORATED BY REFERENCE

This application is based upon and claims the benefit of priority from the corresponding Japanese Patent Application No. 2012-037494 filed on Feb. 23, 2012, the entire contents of which are incorporated herein by reference.

BACKGROUND

The present disclosure relates to an optical scanning apparatus for irradiating a light beam and an image forming apparatus for forming an image using an electrostatic latent image formed by the irradiation of a light beam.

Image forming apparatuses such as printers and copiers often include a photosensitive drum that has a circumferential face for holding a toner image, and an optical scanning apparatus for irradiating a light beam on the circumferential face of the photosensitive drum. When the optical scanning apparatus irradiates a light beam on the circumferential face of the photosensitive drum, a potential difference arises on the circumferential face of the photosensitive drum, between areas being irradiated by the light beam from the optical scanning apparatus and areas not being irradiated. Accordingly, when the optical scanning apparatus emits a light beam in accordance with image data, an electrostatic latent image corresponding to the image data is formed on the circumferential face of the photosensitive drum. When toner is supplied onto the circumferential face of the photosensitive drum, on which the electrostatic latent image is formed, the toner becomes distributed according to the potential difference on the photosensitive drum. As a result, a toner image is formed on the circumferential face of the photosensitive drum. The toner image on the photosensitive drum is then electrostatically transferred to a sheet.

An optical scanning apparatus typically has a laser light source that emits a laser light beam, and a polygon mirror that rotates so that the laser light beam emitted from the laser light source moves in a main scanning direction. The position of the irradiation point of the laser light beam on the circumferential face of the photosensitive drum is defined in the main scanning direction according to the rotation angle of the polygon mirror.

In order to form an electrostatic latent image, the photosensitive drum may also rotate. The position of the irradiation point of the laser light beam on the circumferential face of the photosensitive drum is defined in a sub-scanning direction as a result of this.

The emission timing of the laser light beam may be adjusted according to the rotation positions of the polygon mirror and of the photosensitive drum. The optical scanning apparatus typically includes a light receiving element that receives the laser light beam reflected by the polygon mirror. If the polygon mirror is at a predetermined rotation position, the light receiving element receives the laser light beam. The laser light source emits the laser light beam at an appropriate time according to the light receiving timing of the light receiving element and the image data.

If the light receiving element appropriately receives the laser light beam, the start position of a writing line conforms to the sub-scanning direction in order to form an image.

If the light receiving element is located in a movement plane defined by the movement of the light beam according to the rotation of the polygon mirror, the light receiving element may be able to receive the laser light beam. However, if the light receiving element becomes separated from the movement plane, the light receiving element cannot receive the laser light beam. If the light receiving element does not receive the laser light beam, the image forming function of the image forming apparatus is impaired. As a result, the image forming apparatus may, for example, output a white sheet with nothing recorded thereon. Or, the image forming apparatus may output a sheet that has a black image formed on its entirety.

SUMMARY

An optical scanning apparatus according to one aspect of the present disclosure includes a reflecting mechanism, a light receiving element and a restricting mechanism. The reflecting mechanism reflects a light beam such that an irradiation point of the light beam moves in a predetermined scanning direction. The light receiving element is arranged in a movement plane defined by the light beam reflected by the reflecting mechanism, and the light receiving element outputs a light reception signal for adjusting an irradiation timing of the light beam in accordance with reception of the light beam reflected by the reflecting mechanism. The restricting mechanism positions the light receiving element relative to the movement plane.

An image forming apparatus according to another aspect of the present disclosure includes an optical scanning apparatus. The optical scanning apparatus includes a reflecting mechanism, a light receiving element and a restricting mechanism. The reflecting mechanism reflects a light beam such that an irradiation point of the light beam moves in a predetermined scanning direction. The light receiving element is arranged in a movement plane defined by the light beam reflected by the reflecting mechanism, and the light receiving element outputs a light reception signal for adjusting an irradiation timing of the light beam in accordance with reception of the light beam reflected by the reflecting mechanism. The restricting mechanism positions the light receiving element relative to the movement plane.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A is a schematic plan view of the holding plate to which the laser light source shown in FIG. 7 is attached.

DETAILED DESCRIPTION OF THE PREFERRED EMBODIMENTS

Hereinafter, examples of an image forming apparatus and an optical scanning apparatus will be described with reference to the accompanying drawings. The terms used hereinafter to express directions such as "up", "down", "left", and "right" are simply for the purpose of clarifying the description. Accordingly, the drawings and following detailed description are not intended to limit the principles of the image forming apparatus and the optical scanning apparatus in any way.

Image Forming Apparatus

Figure 1:
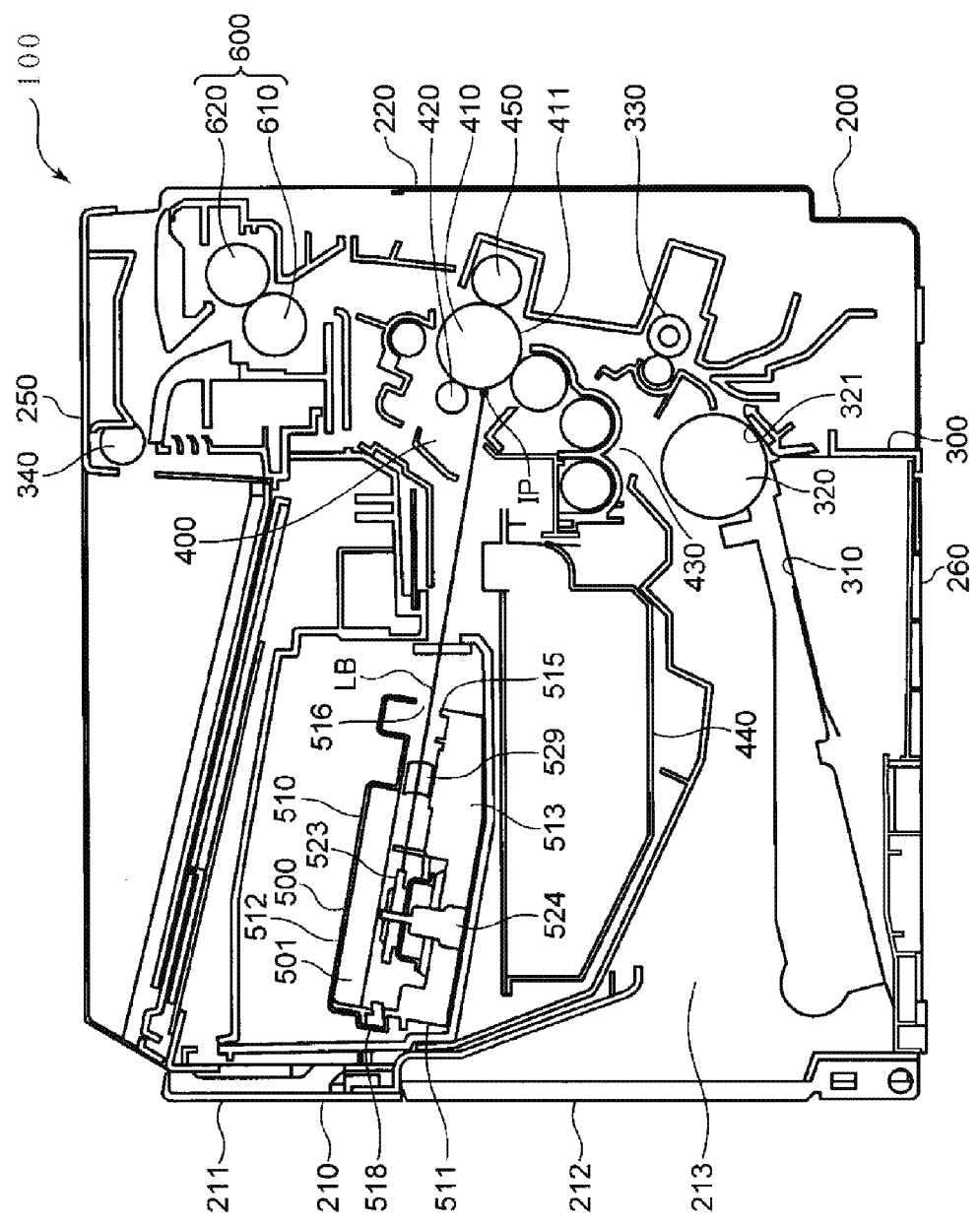
FIG. 1 is a schematic cross-sectional view of a printer given as an example of an image forming apparatus.
Figure 2:
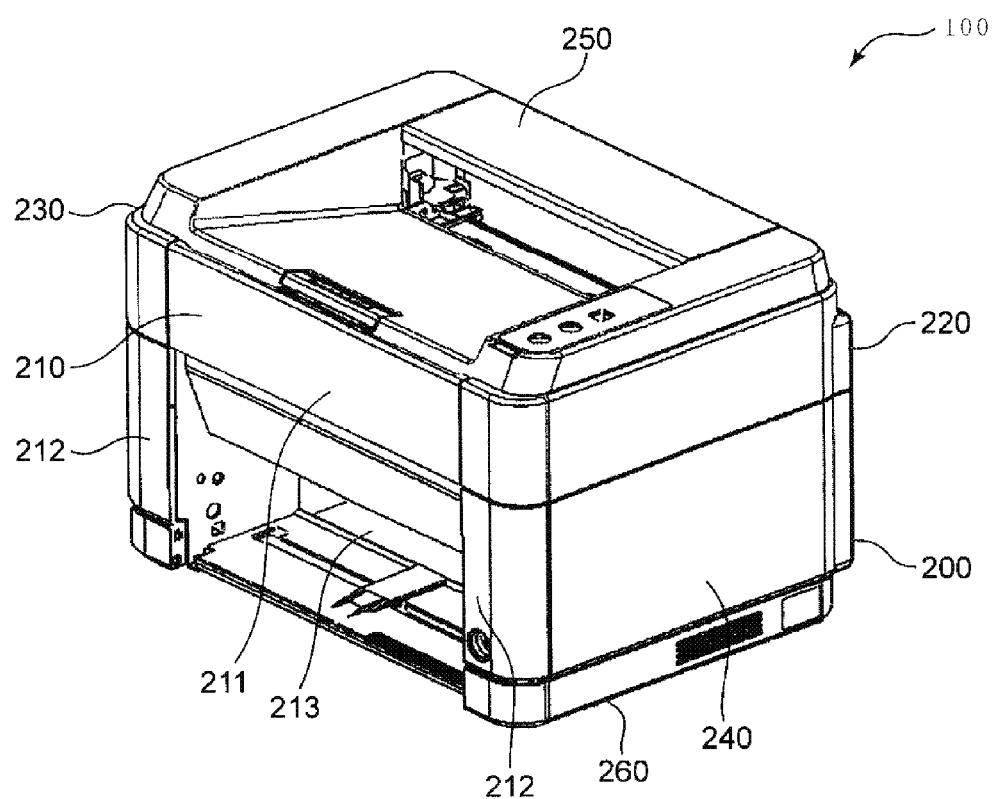
FIG. 2 is a schematic perspective view of the printer shown in FIG. 1.

FIG. 1 is a schematic cross-sectional view of a printer 100 given as an example of an image forming apparatus. FIG. 2 is a schematic perspective view of the printer 100. The printer 100 will be described below with reference to FIGS. 1 and 2.

The printer 100 includes a rectangular box-shaped main casing 200. Various apparatuses (described later) for forming images may be housed inside the main casing 200.

The main casing 200 includes a front wall 210 that is stood upright, a back wall 220 opposite the front wall 210, a left wall 230 that is stood upright between the front wall 210 and the back wall 220, and a right wall 240 opposite the left wall 230. The main casing 200 further includes an upper wall 250 that obstructs an area enclosed by the upper edges of the front wall 210, the back wall 220, the left wall, 230 and the right wall 240, and a lower wall 260 on the opposite side of the upper wall 250.

The front wall 210 includes a front cover 211 that is adjacent to the front edge of the upper wall 250, and upright plates 212 arranged on the left and the right of the front cover 211. The front cover 211 extends horizontally along the front edge of the upper wall 250. On the other hand, the upright plates 212 extend downward from the front edge of the upper wall 250. Accordingly, the front wall 210 has the shape of a door frame (portal frame), and defines an opening portion 213 in the lower portion of the main casing 200.

The printer 100 includes a cassette 300 configured to house sheets, such as paper sheets or label sheets or envelopes. The cassette 300 is inserted into the main casing 200 through the opening portion 213 defined by the front wall 210. The cassette 300 also includes a lifting plate 310 that supports the sheets. The lifting plate 310 pushes the front edge of the sheets upward.

The printer 100 includes a sheet feed roller 320 that comes into contact with the front edge of the sheets pushed upward by the lifting plate 310, and a separating plate 321 that is adjacent to the sheet feed roller 320. The sheet feed roller 320 rotates so as to draw a sheet from the cassette 300. The separating plate 321 applies frictional force to the lower face of the sheet. If the sheet feed roller 320 draws more than one sheet from the cassette 300, the sheets are separated by the frictional force applied by the separating plate 321. When the sheet feed roller 320 draws one sheet from the cassette 300, the sheet feed roller 320 overcomes the frictional force applied by the separating plate 321 and sends the sheet downstream. As a result, sheets are sent downstream one sheet at a time. The sheet then moves upward while passing through a conveying path formed along the back wall 220 of the main casing 200.

The printer 100 further includes a pair of registration rollers 330 that receive a sheet sent from the sheet feed roller 320, and an image forming portion 400 that forms an image on a sheet. The pair of registration rollers 330 supply a sheet to the image forming portion 400 in conformity with an image formation step (described later) executed by the image forming portion 400.

The image forming portion 400 includes a photosensitive drum 410 that has an circumferential face 411 on which an electrostatic latent image and a toner image are formed, a charger 420 that uniformly charges the circumferential face 411 of the photosensitive drum 410, and an optical scanning apparatus 500 that irradiates a laser light beam LB on the charged circumferential face 411 of the photosensitive drum 410. As the photosensitive drum 410 rotates, an electrostatic latent image is formed on the circumferential face 411 of the photosensitive drum 410, and then a toner image is formed. The toner image is ultimately transferred from the circumferential face 411 of the photosensitive drum 410 to a sheet that was sent by the pair of registration rollers 330.

The printer 100 receives image data from an external apparatus (such as a personal computer or other suitable apparatus (not shown)). The optical scanning apparatus 500 emits the laser light beam LB in accordance with the image data. As a result, an irradiation point IP of the laser light beam LB appears on the circumferential face 411 of the photosensitive drum 410.

The optical scanning apparatus 500 moves the laser light beam LB in a main scanning direction in accordance with the image data so as to scan the circumferential face 411 of the photosensitive drum 410. As a result, the irradiation point IP moves in the main scanning direction.

The circumferential face 411 on which the laser light beam LB is irradiated moves due to rotation of the photosensitive drum 410. The position of the irradiation point IP in a sub-scanning direction (direction substantially orthogonal to the main scanning direction) on the circumferential face 411 of the photosensitive drum 410 is determined as a result of this. The printer 100 determines an irradiation area of the laser light beam LB in the main scanning direction and the sub-scanning direction in accordance with the image data. The optical scanning apparatus 500 emits the laser light beam LB at emission times that are appropriately determined in accordance with the rotation angle of the photosensitive drum 410 and the image data, such that the irradiation point IP appears in the irradiation area. As a result, an electrostatic latent image is formed on the circumferential face 411 of the photosensitive drum 410. In the present embodiment, the photosensitive drum 410 is given as an example of an image carrying body. The circumferential face 411 of the photosensitive drum 410 is given as an example of an image carrying face. The laser light beam LB is given as an example of a light beam.

The image forming portion 400 further includes a developing apparatus 430 that supplies toner on the circumferential face 411 of the photosensitive drum 410 on which the electrostatic latent image is formed, and a toner container 440 that supplies toner to the developing apparatus 430. Due to the supply of toner from the developing apparatus 430, a toner image that matches the electrostatic latent image is formed on the circumferential face 411 of the photosensitive drum 410. Toner is supplied from the toner container 440 when necessary so as to prevent a shortage of toner in the developing apparatus 430.

The image forming portion 400 further includes a transfer roller 450 that receives a sheet sent from the pair of registration rollers 330, while working in cooperation with the photosensitive drum 410. When a sheet passes between the photosensitive drum 410 and the transfer roller 450, the transfer roller 450 causes the toner image on the circumferential face 411 of the photosensitive drum 410 to become attached to the sheet. As a result, the toner image is transferred to the sheet. The photosensitive drum 410 and the transfer roller 450 then send the sheet upward.

The printer 100 further includes a fixing apparatus 600 that fixes the toner image to the sheet. The fixing apparatus 600 includes a heating roller 610 that generates heat for melting the toner on the sheet, and a pressure roller 620 that presses the face of the sheet on which the toner image is formed against the heating roller 610. The sheet sent by the photosensitive drum 410 and the transfer roller 450 passes between the heating roller 610 and the pressure roller 620. At this time, the toner that melted due to the heating roller 610 sinks into the sheet, and the toner image is fixed to the sheet. The fixing apparatus 600 then sends the sheet farther upward.

The printer 100 further includes a sheet discharge roller 340. The fixing apparatus 600 sends the sheet to the sheet discharge roller 340. The sheet discharge roller 340 discharges the sheet from the main casing 200.

Figure 3:
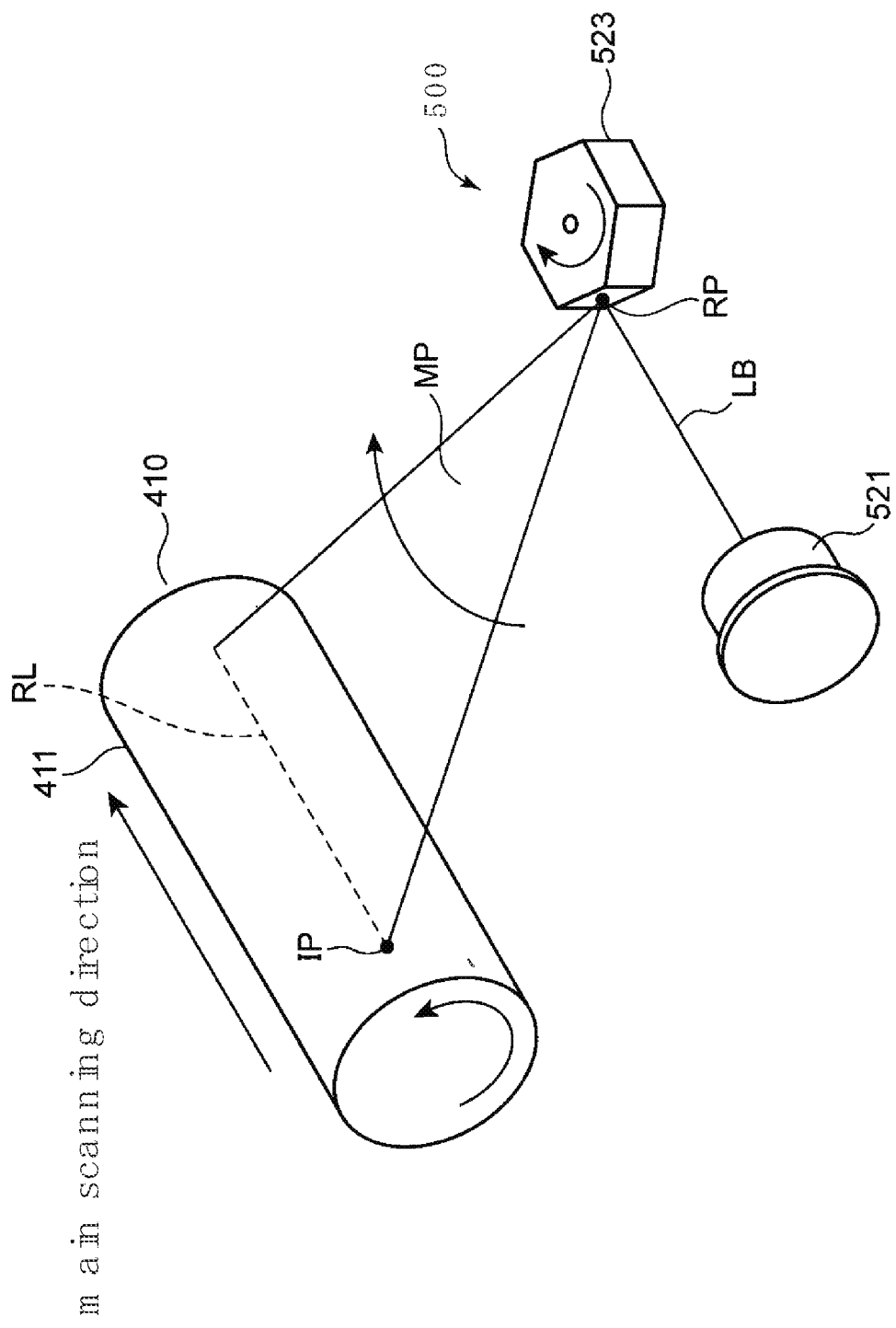
FIG. 3 is a schematic diagram showing an electrostatic latent image formation step executed by the printer shown in FIG. 1.

FIG. 3 is a schematic diagram showing an electrostatic latent image formation step executed by the optical scanning apparatus 500. The electrostatic latent image formation step will be described below with reference to FIGS. 1 and 3.

As shown in FIG. 3, the optical scanning apparatus 500 includes a laser light source 521 that emits the laser light beam LB, and a polygon mirror 523 that receives the laser light beam LB. As shown in FIG. 1, the optical scanning apparatus 500 further includes a motor 524 that rotates the polygon mirror 523, and a casing 510 that defines a housing space 501 in which the polygon mirror 523 is housed. In the present embodiment, the laser light source 521 is given as an example of a light source.

As shown in FIG. 3, the laser light beam LB emitted from the laser light source 521 travels toward the polygon mirror 523. The polygon mirror 523 reflects the laser light beam LB toward the photosensitive drum 410.

When the motor 524 rotates the polygon mirror 523, the irradiation point IP of the laser light beam LB that appears on the circumferential face 411 of the photosensitive drum 410 moves in the main scanning direction. In FIG. 3, the movement locus (referred to hereinafter as a "rendering line RL") of the irradiation point IP on the circumferential face 411 of the photosensitive drum 410 is shown using a dashed line. In the present embodiment, the polygon mirror 523 and the motor 524 are given as an example of a reflecting mechanism.

The point where the laser light beam LB from the laser light source 521 is reflected at the polygon mirror 523 toward the photosensitive drum 410 is referred to as a "reflection point RP" in the following description. FIG. 3 shows a movement plane MP that spreads out radially from the reflection point RP. The movement plane MP is defined by the laser light beam LB (the movement of the irradiation point IP) moving in the main scanning direction. In other words, the polygon mirror 523 and the motor 524 reflect the laser light beam LB such that the light beam moves along the movement plane MP. Note that "movement plane MP" refers to not only the locus plane (the triangular area shown in FIG. 3) in which the laser light beam LB reflected by the polygon mirror 523 actually moves, but also to an infinite plane that spreads out at the same level as the locus plane.

The laser light beam LB moves in the main scanning direction along the movement plane MP. When the photosensitive drum 410 rotates, the irradiation point IP moves to a new rendering line RL on the circumferential face 411 of the photosensitive drum 410. As a result, an electrostatic latent image is formed on the photosensitive drum 410.

Optical Scanning Apparatus

Figure 4:
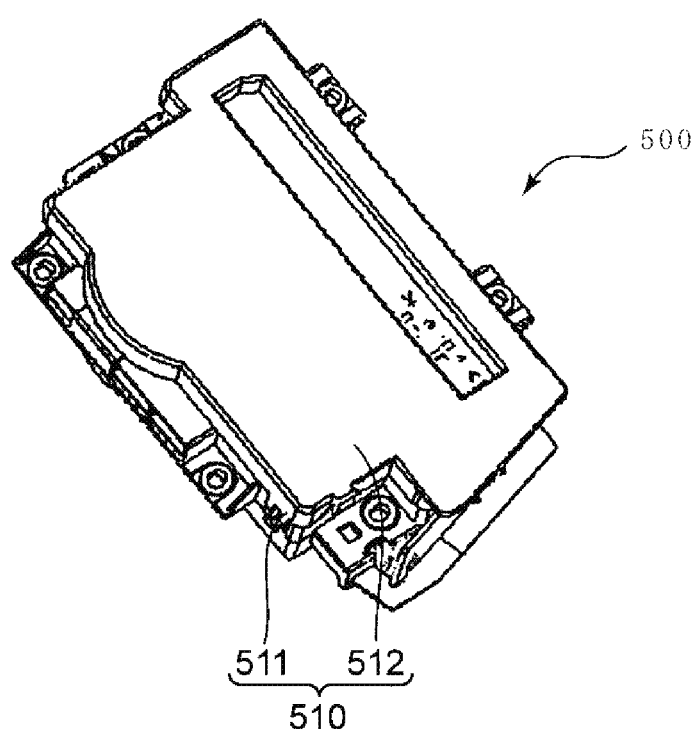
FIG. 4 is a schematic perspective view of an optical scanning apparatus of the printer shown in FIG. 1.

FIG. 4 is a schematic perspective view of the optical scanning apparatus 500. The optical scanning apparatus 500 will be described below with reference to FIGS. 1 and 4.

As described above, the optical scanning apparatus 500 includes the casing 510. The casing 510 includes a box body 511 that is open at the top, and a lid body 512 that obstructs the opening portion of the box body 511.

Figure 5:
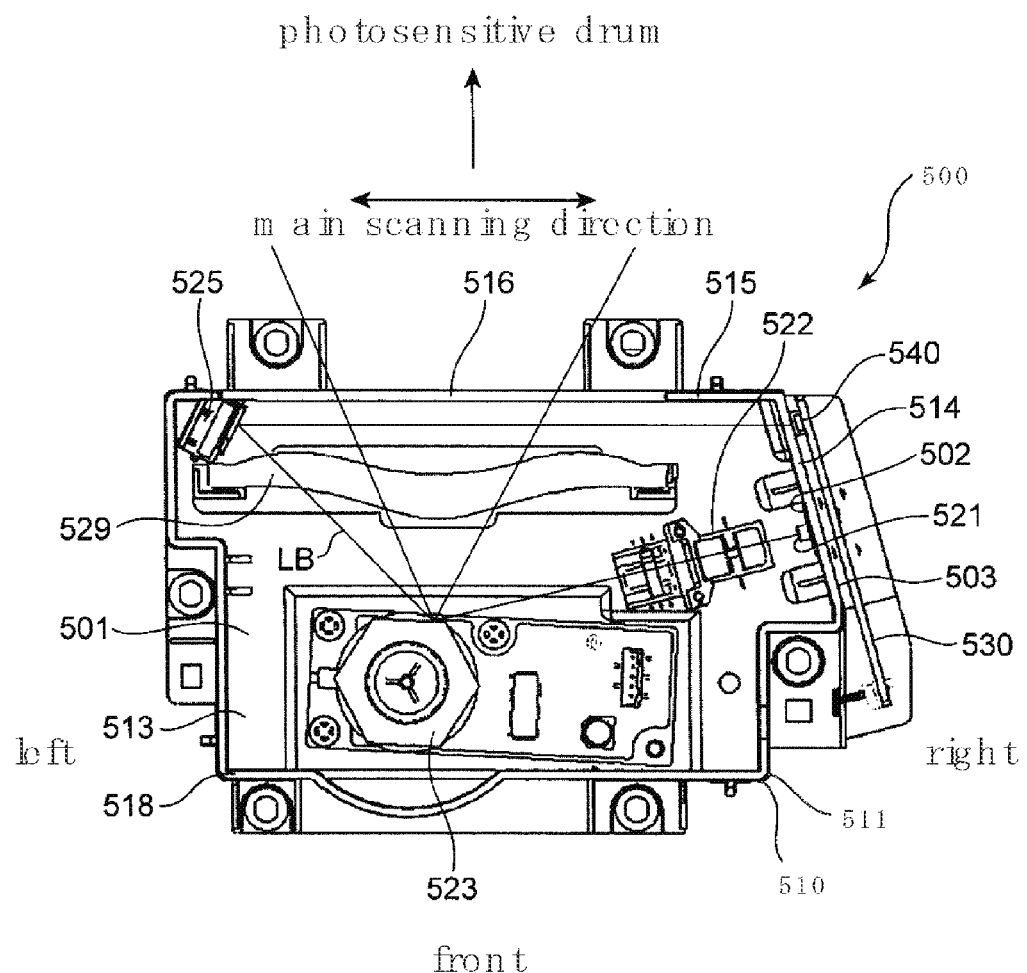
FIG. 5 is a schematic plan view of the optical scanning apparatus shown in FIG. 4.

FIG. 5 is a schematic plan view of the optical scanning apparatus 500. The optical scanning apparatus 500 will be described below in further detail with reference to FIGS. 1 and 3 to 5. Note that in FIG. 5, the lid body 512 has not been illustrated as part of the optical scanning apparatus 500 for better illustrating the optical scanning apparatus 500.

In addition to the casing 510, the laser light source 521, the polygon mirror 523, and the motor 524, the optical scanning apparatus 500 also includes an optical element group 522 that adjusts characteristics of the laser light beam LB (including, but not limited to, the beam diameter), and an fθ lens 529 that focuses the laser light beam LB onto the circumferential face 411 of the photosensitive drum 410.

The box body 511 includes a support plate 513 to which the optical element group 522, the polygon mirror 523, the motor 524, and the fθ lens 529 are attached, and a peripheral wall 518 that stands upright from the peripheral edge of the support plate 513. The peripheral wall 518 includes an inner face 502 that defines the housing space 501 in which the polygon mirror 523 and the fθ lens 529 are housed, and an outer face 503 on the opposite side of the inner face 502.

The peripheral wall 518 includes an opening plate 515 provided between the photosensitive drum 410 and the polygon mirror 523. An opening portion 516 that extends in the main scanning direction is formed in the opening plate 515. The laser light beam LB emitted from the laser light source 521 passes through the optical element group 522 and arrives at the polygon mirror 523. As previously described in connection with FIG. 3, the laser light beam LB is then reflected by the polygon mirror 523 and moves in the main scanning direction. The laser light beam LB reflected by the polygon mirror 523 passes through the fθ lens 529. The laser light beam LB then passes through the opening portion 516 and arrives at the circumferential face 411 of the photosensitive drum 410.

The peripheral wall 518 further includes a holding plate 514 that holds the laser light source 521. In other words, the holding plate 514 is included in the casing 510. The optical scanning apparatus 500 includes a reflecting mirror 525 that is supported between the opening plate 515 and the fθ lens 529 by a support plate 513. In the present embodiment, the inner face 502 of the holding plate 514 defines the right-side boundary of the housing space 501. The reflecting mirror 525 is arranged in a left corner portion of the housing space 501. When the polygon mirror 523 is at a predetermined rotation angle, the laser light beam LB reflected by the polygon mirror 523 becomes oriented toward the reflecting mirror 525. The reflecting mirror 525 reflects the laser light beam LB to the right. Note that optical setting of the reflecting mirror 525 is performed appropriately such that the laser light beam LB reflected by the reflecting mirror 525 propagates along the movement plane MP described in connection with FIG. 3. In the present embodiment, the polygon mirror 523, the motor 524, and the reflecting mirror 525 are given as an example of a reflecting mechanism.

In the optical scanning apparatus 500 in FIG. 5 the optical scanning apparatus 500 further includes a control board 530 that is arranged opposing the outer face 503 of the holding plate 514. The laser light source 521 is electrically connected to the control board 530. The control board 530 controls the laser light source 521 and appropriately adjusts the emission timing of the laser light beam LB.

The optical scanning apparatus 500 further includes a light receiving element 540 mounted to the control board 530. The light receiving element 540 is arranged in the movement plane MP and receives the laser light beam LB reflected by the polygon mirror 523 and the reflecting mirror 525. In accordance with the reception of the laser light beam LB, the light receiving element 540 outputs a light reception signal for adjusting the irradiation timing of the laser light beam LB. The control board 530 adjusts the irradiation timing of the laser light beam LB from the laser light source 521 in accordance with the light reception signal from the light receiving element 540.

The light receiving element 540 receives the laser light beam LB when the polygon mirror 523 is at a predetermined rotation angle. Accordingly, the control board 530 can determine the start position of the movement of the irradiation point IP in the main scanning direction based on the light reception signal.

Restricting Mechanism

The following describes a restricting mechanism according to various embodiments. The restricting mechanism positions the light receiving element 540 relative to the movement plane MP. For example, the restricting mechanism restricts displacement of the light receiving element 540 relative to the movement plane MP. Since the restricting mechanism suppresses separation of the light receiving element 540 from the movement plane MP, the light receiving element 540 can appropriately receive the laser light beam LB reflected by the polygon mirror 523, the motor 524, and the reflecting mirror 525. Accordingly, the emission timing of the laser light beam LB is appropriately adjusted by the control board 530 that controls the laser light source 521 in accordance with the light reception signal from the light receiving element 540.

First Embodiment of a Restricting Mechanism

Figure 6A:
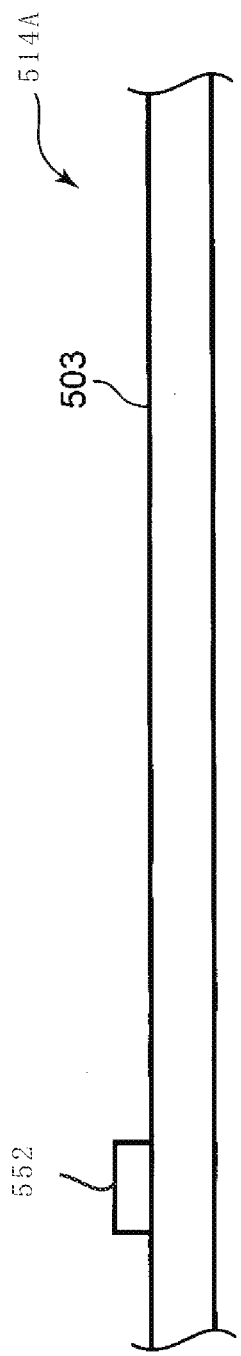
FIG. 6A is a schematic plan view of a holding plate used as a restricting mechanism according to a first embodiment.
Figure 6B:
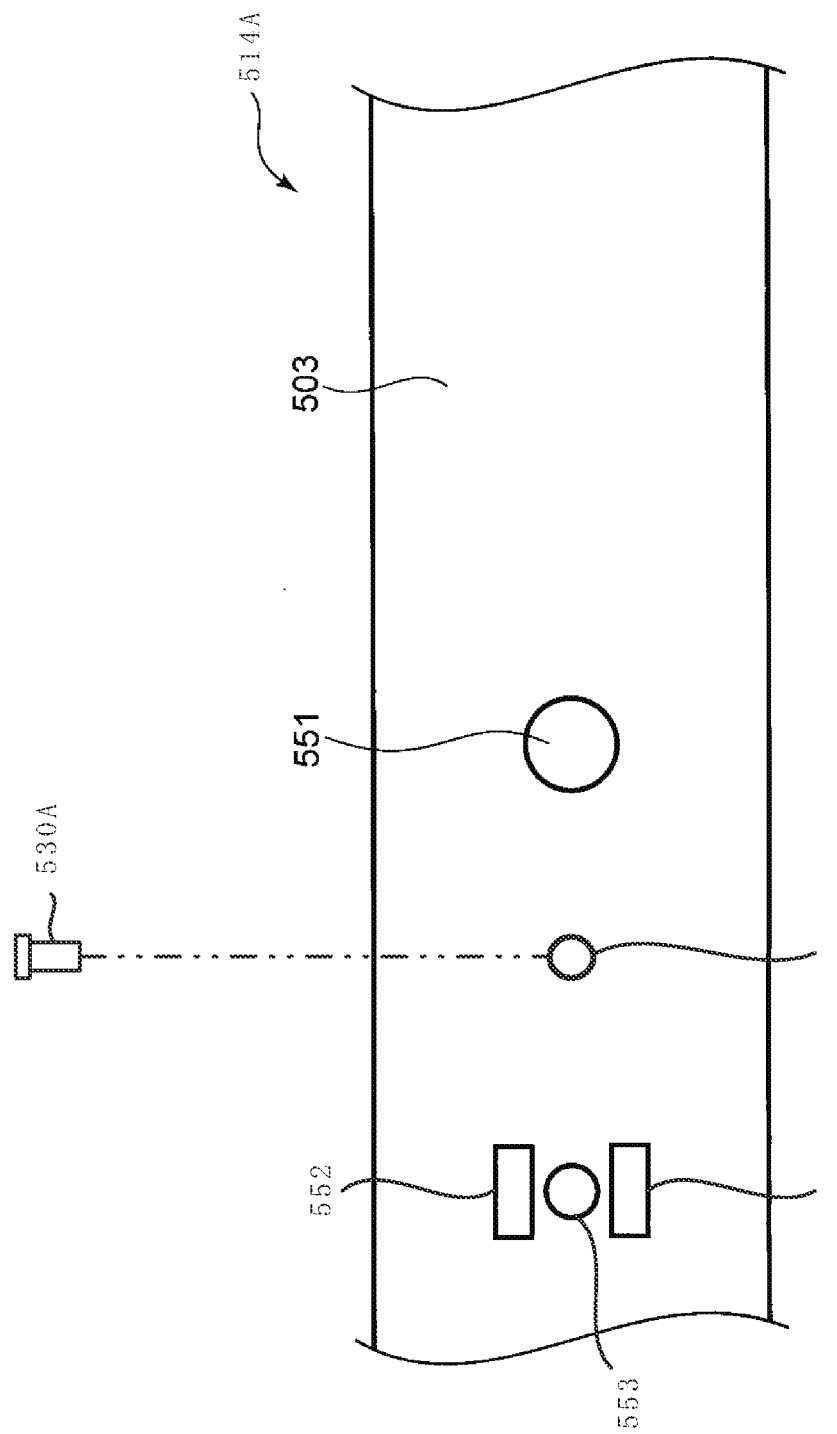
FIG. 6B is a schematic diagram of the outer face of the holding plate shown in FIG. 6A.

FIG. 6A is a schematic plan view of a holding plate 514A used as the restricting mechanism according to a first embodiment. FIG. 6B is a schematic diagram of the outer face 503 of the holding plate 514A shown in FIG. 6A. Note that the holding plate 514A is used as the holding plate 514 of the optical scanning apparatus 500 described in connection with FIG. 5. The holding plate 514A will be described below with reference to FIGS. 5 to 6B. Note that the same reference signs are used for elements that are common to the elements described in connection with FIGS. 1 to 5. Detailed descriptions will not be given for these common elements.

A through hole 551 is formed in the holding plate 514A. The laser light source 521 is inserted into the through hole 551. As a result, the laser light source 521 is appropriately held by the holding plate 514A. In the present embodiment, the through hole 551 is given as an example of a holding portion.

Figure 7:
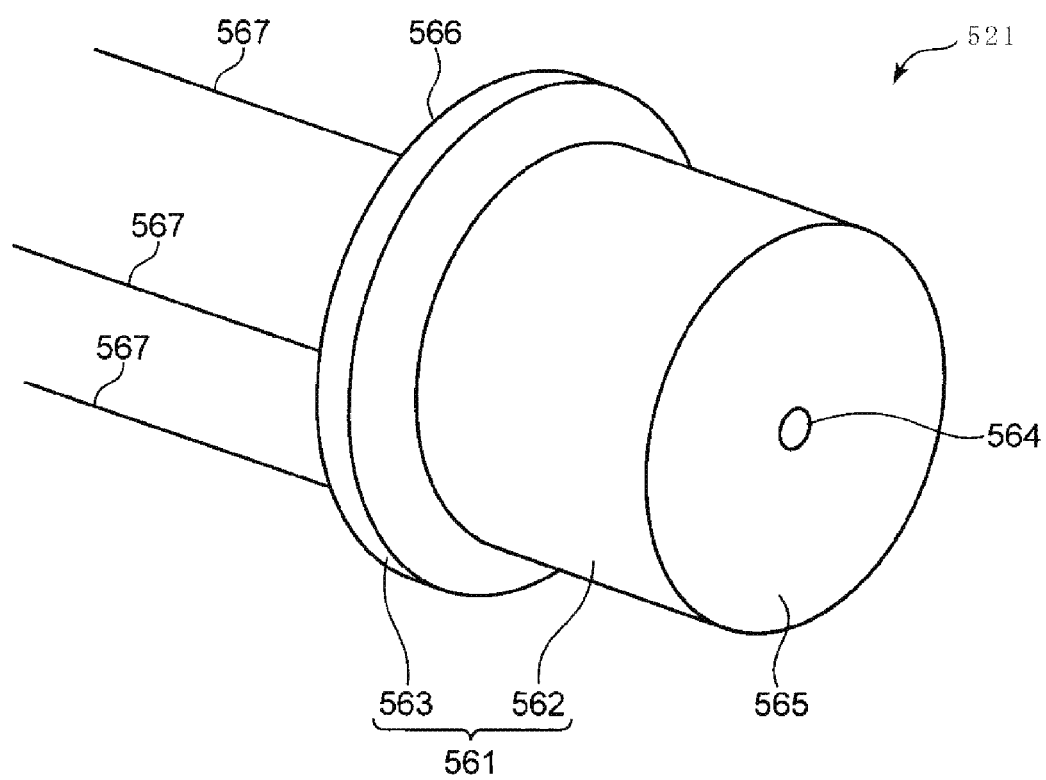
FIG. 7 is a schematic perspective view of a laser light source of the optical scanning apparatus shown in FIG. 4.

FIG. 7 is a schematic perspective view of the laser light source 521. The laser light source 521 will be described below with reference to FIGS. 5, 6B, and 7.

The laser light source 521 includes a body portion 561 formed so as to have a substantially two-level cylindrical shape. The body portion 561 includes an inserted portion 562 that is inserted into the through hole 551, and a base end portion 563 that is larger than the inserted portion 562. An emission opening 564 from which the laser light beam LB is emitted is formed in an end face 565 of the inserted portion 562.

The laser light source 521 further includes leads 567 that extend from an end face 566 of the base end portion 563 on the opposite side of the end face 565 of the inserted portion 562. The laser light source 521 is electrically connected to the control board 530 via the leads 567.

Figure 8B:
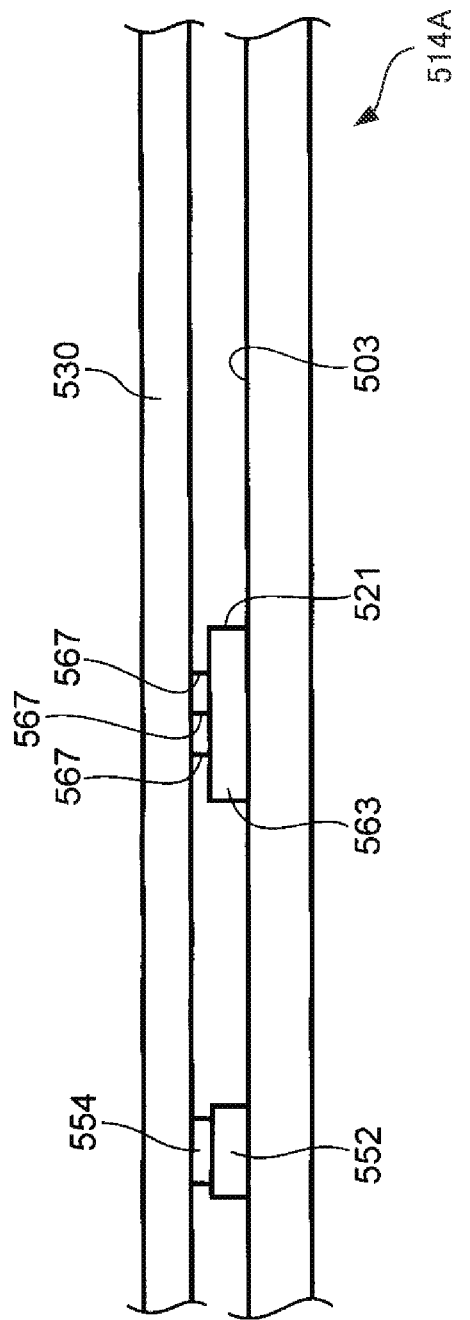
FIG. 8B is a schematic plan view of the holding plate to which a control board that controls the laser light source shown in FIG. 7 is attached.

FIG. 8A is a schematic plan view of the holding plate 514A to which the laser light source 521 is attached. FIG. 8B is a schematic plan view of the holding plate 514A to which the control board 530 is also attached. The following describes the attachment of the laser light source 521 and the control board 530 to the holding plate 514A with reference to FIGS. 6B to 8B.

In the present embodiment, the inserted portion 562 of the laser light source 521 is inserted into the through hole 551 of the holding plate 514A. At this time, the base end portion 563 of the laser light source 521 and the leads 567 protrude out from the outer face 503 of the holding plate 514A.

The control board 530 is arranged adjacent to the holding plate 514A. The leads 567 are soldered to the control board 530. As a result, the laser light source 521 and the control board 530 are electrically connected.

Figure 9:
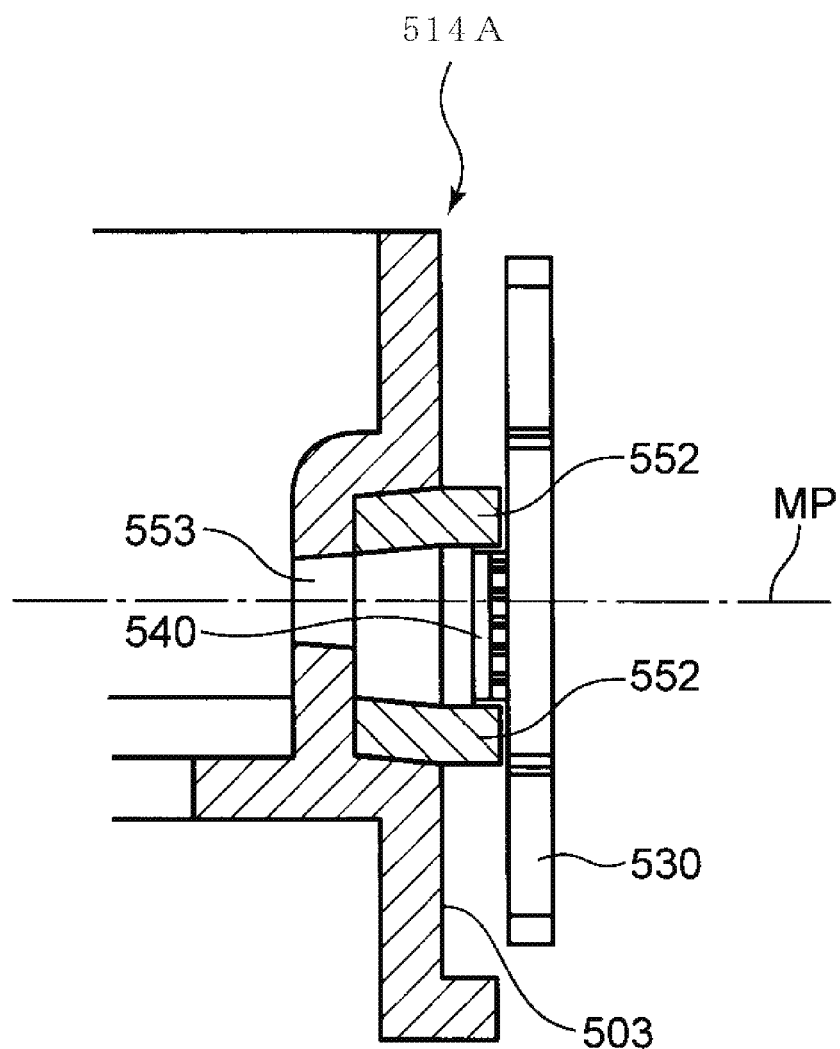
FIG. 9 is a schematic vertical cross-sectional view of the holding plate serving as the restricting mechanism that restricts displacement of the light receiving element of the optical scanning apparatus shown in FIG. 4.

FIG. 9 is a schematic vertical cross-sectional view of the holding plate 514A serving as a restricting mechanism for restricting displacement of the light receiving element 540 relative to the movement plane MP. Note that in FIG. 9, the movement plane MP is schematically shown using a dashed-dotted line. The restricting mechanism will be described below with reference to FIGS. 5, 8B, and 9.

The outer face 503 of the holding plate 514A opposes the control board 530. In the present embodiment, the outer face 503 is given as an example of an opposing face.

The holding plate 514A includes a pair of bump portions 552 that protrude from the outer face 503 toward the control board 530. In the present embodiment, the pair of bump portions 552 are given as an example of protruding portions. The pair of bump portions 552 are provided on the holding plate 514A as references for positioning at the time when the light receiving element 540 is fixed such that the light receiving element 540 is arranged in the movement plane MP.

The light receiving element 540 mounted to the control board 530 protrudes toward the outer face 503 of the holding plate 514A, and is sandwiched between the pair of bump portions 552. The movement plane MP passes between the pair of bump portions 552. Accordingly, if the light receiving element 540 becomes displaced in a direction orthogonal to the movement plane MP, the light receiving element 540 comes into contact with one of the bump portions 552. Displacement of the light receiving element 540 relative to the movement plane MP is restricted as a result of this. In other words, displacement of the light receiving element 540 mounted to the control board 530 relative to the movement plane MP is restricted by contact between the bump portions 552 and the light receiving element 540. Specifically, the direction of displacement of the light receiving element 540 that is restricted by the holding plate 514A is a direction orthogonal to the movement plane MP. According to the above-described configuration, the holding plate 514A restricts the light receiving element 540 in a direction orthogonal to movement plane MP. In this way, the light receiving element 540 is appropriately positioned by the holding plate 514A using the casing 510, and thus separation of the light receiving element 540 from the movement plane MP is suppressed.

A through hole 553 is formed in the holding plate 514A between the pair of bump portions 552. The movement plane MP passes through the through hole 553. Accordingly, the laser light beam LB emitted from the laser light source 521 is reflected by the reflecting mirror 525, and then passes through the through hole 553 and arrives at the light receiving element 540. The light receiving element 540 can therefore appropriately receive the laser light beam LB reflected by the polygon mirror 523 and the reflecting mirror 525. In the present embodiment of a restricting mechanism, the through hole 553 is given as an example of a light transmitting portion that allows the passage of the laser light beam LB to the light receiving element 540.

After the light receiving element 540 is arranged between the pair of bump portions 552, the control board 530 is fixed to a through hole 530B of the holding plate 514A using an appropriate fixture 530A (e.g., a screw), and thus is connected to the holding plate 514A. At this time, the fixing position of the light receiving element 540 relative to the movement plane MP is determined by, for example, the light receiving element 540 coming into contact with either of the bump portions 552 of the holding plate 514A. In other words, the bump portions 552 of the holding plate 514A determine references for the fixing position of the light receiving element 540. For this reason, an assembly worker can position the light receiving element 540 relative to the movement plane MP by fixing the control board 530 to the holding plate 514A using the fixture 530A while the light receiving element 540 has been brought into contact with the bump portions 552. For example, even if the control board 530 and the holding plate 514A undergo relative rotational movement as the fixture 530A is rotated, that rotational movement is restricted by contact between the light receiving element 540 and the bump portions 552, and the light receiving element 540 is positioned relative to the movement plane MP.

Second Embodiment of a Restricting Mechanism

Figure 10:
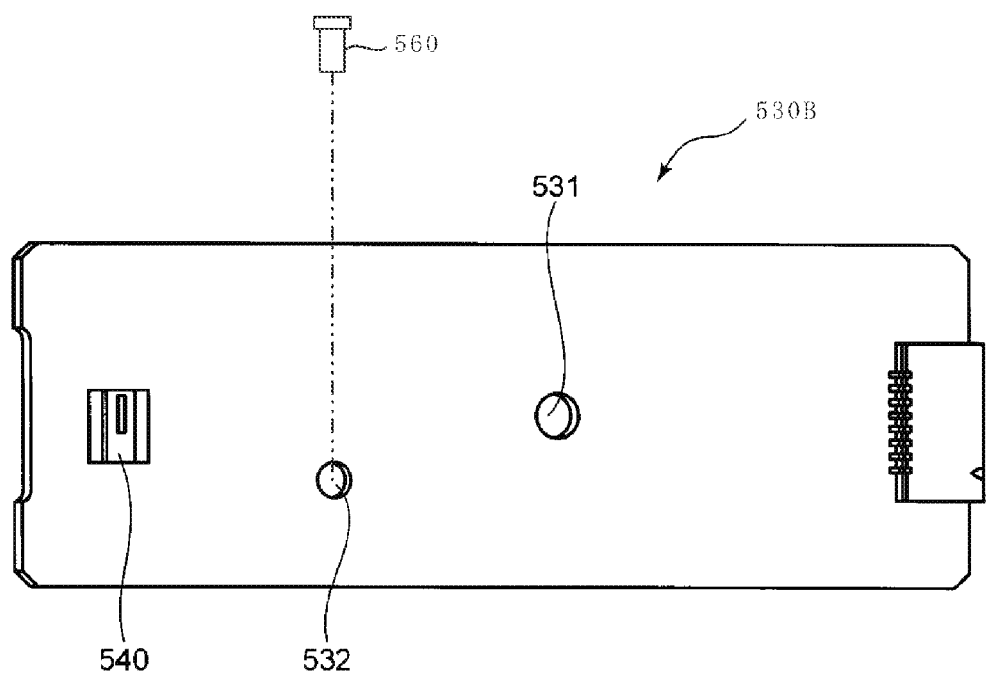
FIG. 10 is a schematic perspective view of a control board that is used along with a restricting mechanism according to a second embodiment.

FIG. 10 is a schematic perspective view of a control board 530B that is used along with the restricting mechanism according to a second embodiment. Note that the control board 530B is used as the control board 530 of the optical scanning apparatus 500 described in connection with FIG. 5. The control board 530B will be described below with reference to FIGS. 5 and 10. Note that the same reference signs are used for elements that are common to the elements described in connection with FIGS. 1 to 5 and the elements described in connection with the first embodiment. Detailed descriptions will not be given for these common elements.

The light receiving element 540 is mounted to the control board 530B. The control board 530B controls the irradiation timing of the laser light beam LB from the laser light source 521 in accordance with a light reception signal output by the light receiving element 540.

Figure 11:
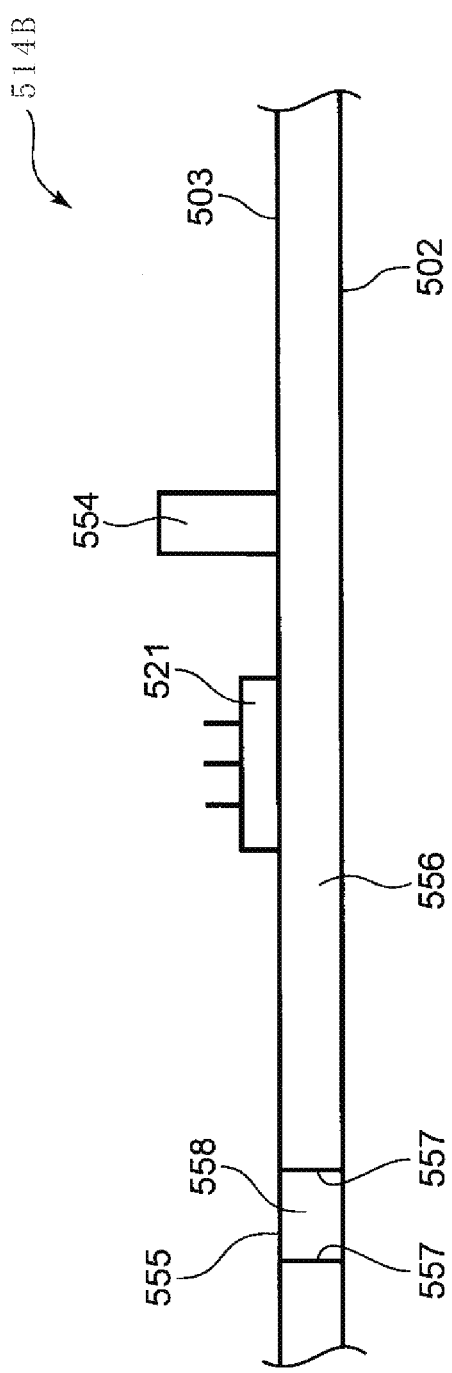
FIG. 11 is a schematic plan view of a holding plate used as the restricting mechanism according to the second embodiment.

FIG. 11 is a schematic plan view of a holding plate 514B used as the restricting mechanism according to the second embodiment. Note that the holding plate 514B is used as the holding plate 514 of the optical scanning apparatus 500 described in connection with FIG. 5. The holding plate 514B will be described below with reference to FIGS. 6B, 10, and 11. Note that the same reference signs are used for elements that are common to the elements described in connection with FIGS. 1 to 5 and the elements described in connection with the first embodiment. Detailed descriptions will not be given for these common elements.

Similarly to the holding plate 514A described in connection with the first embodiment of a restricting mechanism, a through hole 551 is formed in the holding plate 514B. The laser light source 521 is inserted into the through hole 551 of the holding plate 514B. As a result, the holding plate 514B can appropriately hold the laser light source 521. In the present embodiment, the through hole 551 formed in the holding plate 514B is given as an example of a holding portion.

As shown in FIG. 11, the holding plate 514B includes a boss 554 that protrudes from the outer face 503. As shown in FIG. 10, a first through hole 531 and a second through hole 532 are formed in the control board 530B. The boss 554 is inserted into the first through hole 531. An appropriate fixture 560 (e.g., a screw) is inserted into the second through hole 532, and thus the control board 530B is appropriately fixed to the holding plate 514B. Before the fixture 560 is inserted into the second through hole 532, the control board 530B can rotate about the boss 554. In the present embodiment, the first through hole 531 is given as an example of a through hole.

Figure 12:
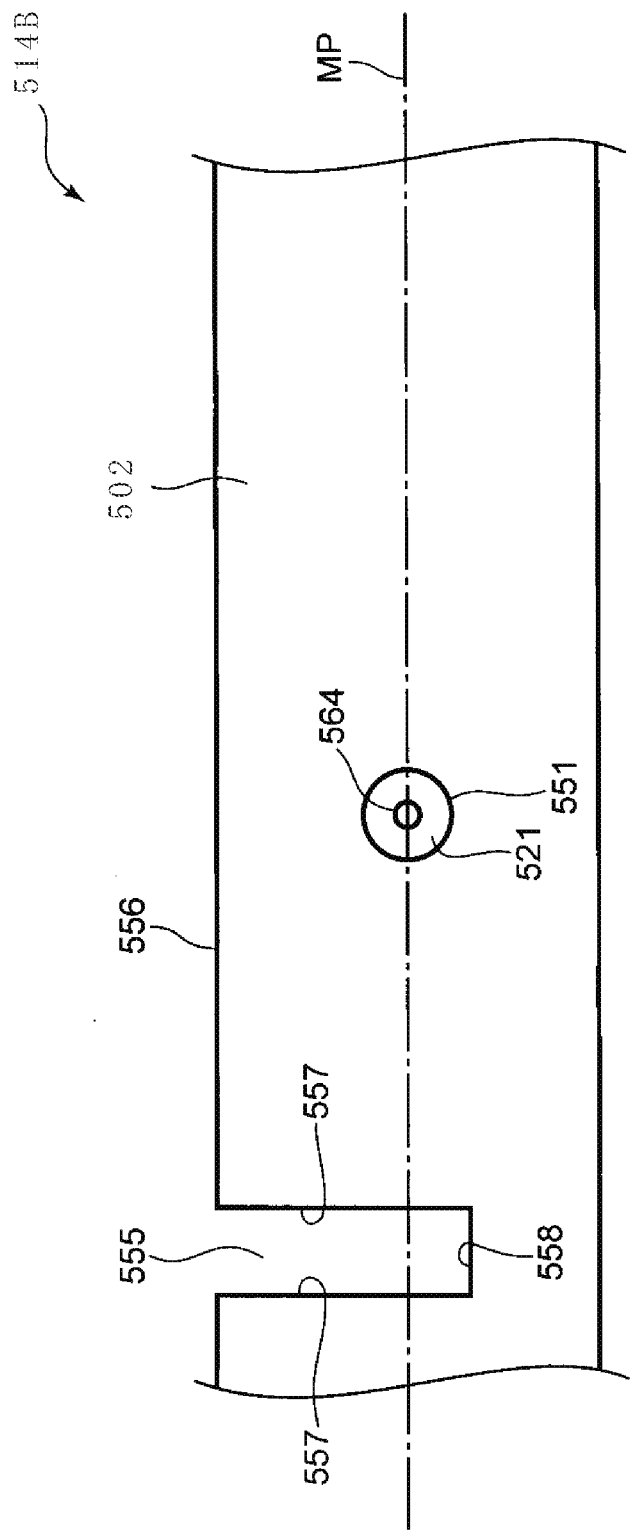
FIG. 12 is a schematic diagram of the inner face of the holding plate shown in FIG. 11.

FIG. 12 is a schematic diagram of the inner face 502 of the holding plate 514B shown in FIG. 11. The holding plate 514B will be described below with reference to FIGS. 5, 11, and 12.

The emission opening 564 of the laser light source 521 is visible through the through hole 551 formed in the holding plate 514B. Accordingly, the laser light source 521 can emit the laser light beam LB into the housing space 501 of the optical scanning apparatus 500.

In FIG. 12, the movement plane MP that crosses the emission opening 564 is shown using a dashed-dotted line. A notch portion 555 is formed in the holding plate 514B. The notch portion 555 extends downward from an upper edge 556 of the holding plate 514B and crosses the movement plane MP.

The holding plate 514B includes a pair of vertical faces 557 that extend downward from the upper edge 556, and a horizontal face 558 that extends horizontally between the pair of vertical faces 557. The pair of vertical faces 557 and the horizontal face 558 define the notch portion 555. In the present embodiment, the pair of vertical faces 557 and the horizontal face 558 are given as examples of a first notch face that defines the notch portion 555. The notch portion 555 is given as an example of a first notch portion.

Figure 13:
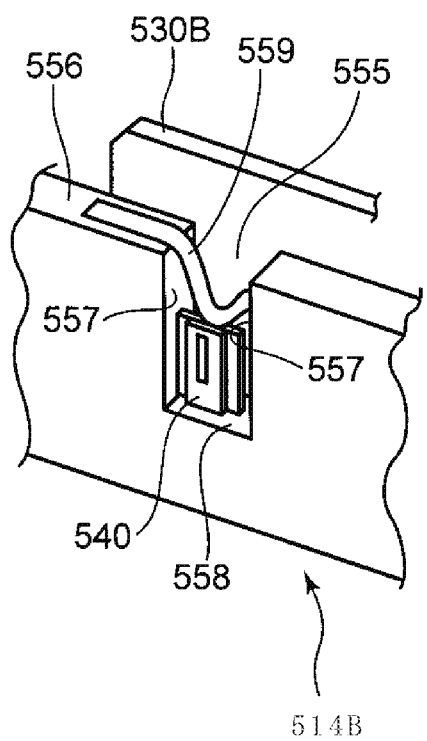
FIG. 13 is a schematic enlarged perspective view of the holding plate shown in FIG. 11.

FIG. 13 is a schematic enlarged perspective view of the holding plate 514B in the periphery of the notch portion 555. The holding plate 514B will be described below with reference to FIGS. 10 to 13.

As shown in FIG. 12, the pair of vertical faces 557 extend downward and intersect the movement plane MP. The horizontal face 558 is located below the movement plane MP. In the present embodiment, the pair of vertical faces 557 are given as examples of first intersecting faces.

As described in connection with FIG. 11, before being fixed to the holding plate 514B, the control board 530B is connected to the holding plate 514B so as to be capable of rotating about the boss 554. After the boss 554 is inserted into the first through hole 531 of the control board 530B, the control board 530B is rotated downward about the boss 554, and thus the light receiving element 540 mounted to the control board 530B is inserted into the notch portion 555. In other words, the notch portion 555 is formed such that the light receiving element 540 is inserted into the notch portion 555 if the control board 530B is rotated about the boss 554. Accordingly, the holding plate 514B and the control board 530B are connected in a simple manner. The control board 530B is rotated downward about the boss 554 until the light receiving element 540 comes into contact with the horizontal face 558. In other words, the control board 530B is connected to the holding plate 514B such that the light receiving element 540 mounted to the control board 530B comes into contact with the horizontal face 558. This suppresses separation of the light receiving element 540 from the movement plane MP. In the present embodiment, the horizontal face 558 is given as an example of a first contact face.

Note that as long as the configuration is such that the light receiving element 540 is positioned by coming into contact with the horizontal face 558 when the control board 530B is connected to the holding plate 514B, the method of connection is not limited to the control board 530B being rotated about the boss 554. In other words, the configuration needs only be such that the reference for the fixing position of the light receiving element 540 is determined by the horizontal face 558 when the control board 530B and the holding plate 514B are connected. For example, a configuration is conceivable in which the notch portion 555 is formed such that the light receiving element 540 is inserted into the notch portion 555 when the control board 530B and the holding plate 514B are moved relative to each other in directions according to which the boss 554 is inserted into the first through hole 531.

After the light receiving element 540 comes into contact with the horizontal face 558, a flat spring 559 is attached to the upper edge 556 of the holding plate 514B. The flat spring 559 comes into contact with the light receiving element 540 in the notch portion 555. As a result, the light receiving element 540 is pressed against the horizontal face 558 by the flat spring 559. Accordingly, the light receiving element 540 is stably held in the movement plane MP. This suppresses separation of the light receiving element 540 from the movement plane MP. In the present embodiment, the flat spring 559 is given as an example of a first pressing portion. Alternatively, another appropriate member for pressing the light receiving element 540 against the horizontal face 558 may be used as the first pressing portion.

After the flat spring 559 is attached, the control board 530B is appropriately fixed to the holding plate 514B using an appropriate fixture 560 that has been inserted into the second through hole 532 of the control board 530B. As a result, rotation of the control board 530B about the boss 554 relative to the holding plate 514B is limited. This suppresses separation of the light receiving element 540 from the movement plane MP.

Third Embodiment of a Restricting Mechanism

Figure 14:
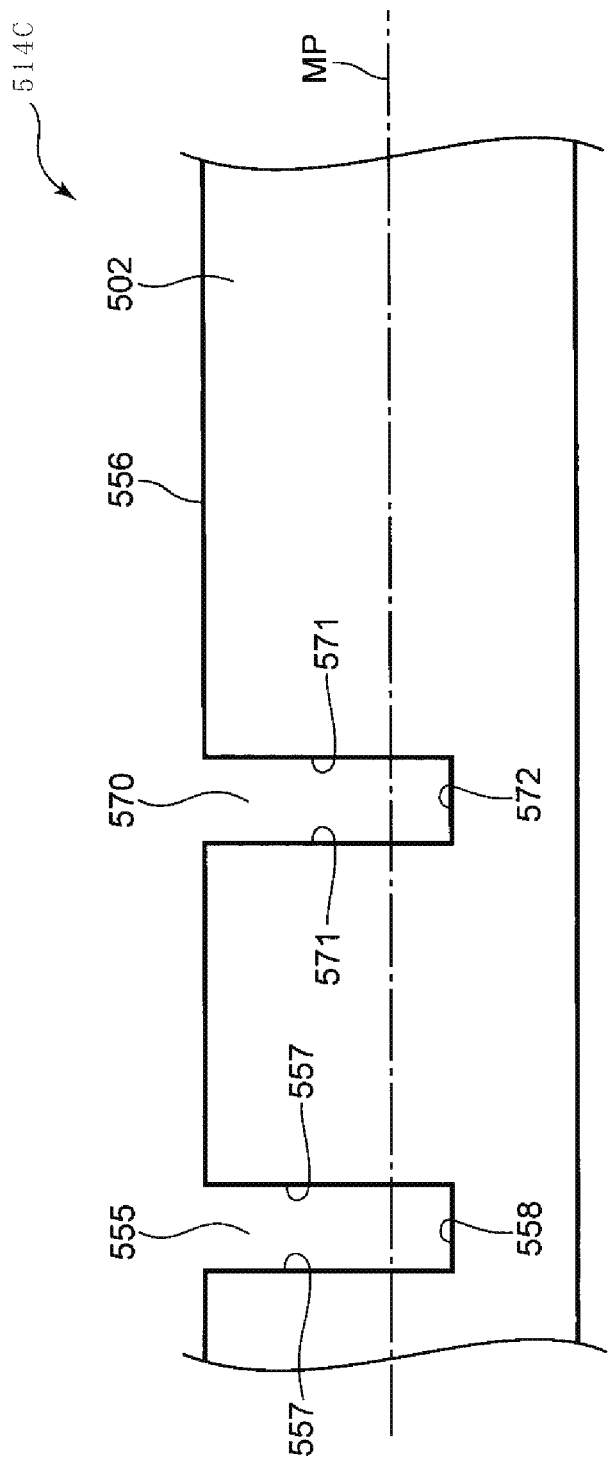
FIG. 14 is a schematic diagram of a holding plate used as a restricting mechanism according to a third embodiment.

FIG. 14 is a schematic diagram of a holding plate 514C used as the restricting mechanism according to a third embodiment. Note that the holding plate 514C is used as the holding plate 514 of the optical scanning apparatus 500 described in connection with FIG. 5. The holding plate 514C will be described below with reference to FIGS. 5, 7, and 14. Note that the same reference signs are used for elements that are common to the elements described in connection with FIGS. 1 to 5 and the elements described in connection with the second embodiment. Detailed descriptions will not be given for these common elements.

In addition to the notch portion 555 described in connection with the second embodiment, a notch portion 570 is also formed in the holding plate 514C. Similarly to the notch portion 555, the notch portion 570 extends downward from the upper edge 556 of the holding plate 514C. As will be described later, the laser light source 521 is inserted into the notch portion 570.

In FIG. 14, the movement plane MP is shown using a dashed-dotted line. If the laser light source 521 is appropriately disposed in the notch portion 570, the movement plane MP crosses the emission opening 564 of the laser light source 521. Similarly to the notch portion 555, the notch portion 570 crosses the movement plane MP. In the present embodiment, the notch portion 570 is given as an example of a second notch portion.

The holding plate 514C includes a pair of vertical faces 571 that extend downward from the upper edge 556, and a horizontal face 572 that extends horizontally between the pair of vertical faces 571. The pair of vertical faces 571 and the horizontal face 572 define the notch portion 570. In the present embodiment, the pair of vertical faces 571 and the horizontal face 572 are given as examples of a second notch face.

Similarly to the vertical faces 557 that define the notch portion 555 into which the light receiving element 540 is inserted, the pair of vertical faces 571 that define the notch portion 570 cross the movement plane MP. Similarly to the horizontal face 558 that defines the notch portion 555, the horizontal face 572 that defines the notch portion 570 is located below the movement plane MP. In the present embodiment, the pair of vertical faces 571 are given as examples of second intersecting faces.

Figure 15:
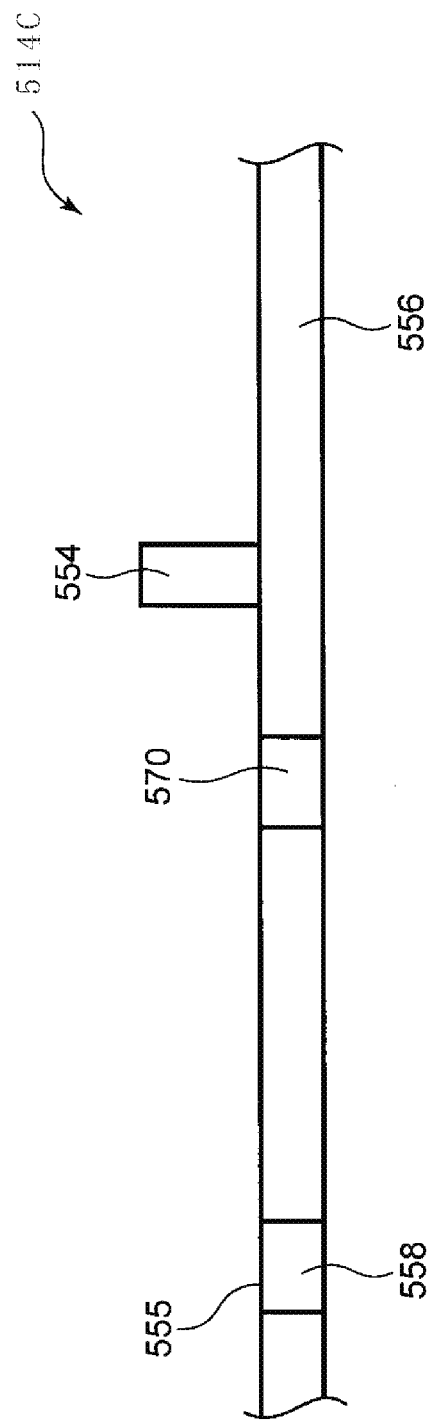
FIG. 15 is a schematic plan view of the holding plate shown in FIG. 14.
Figure 16:
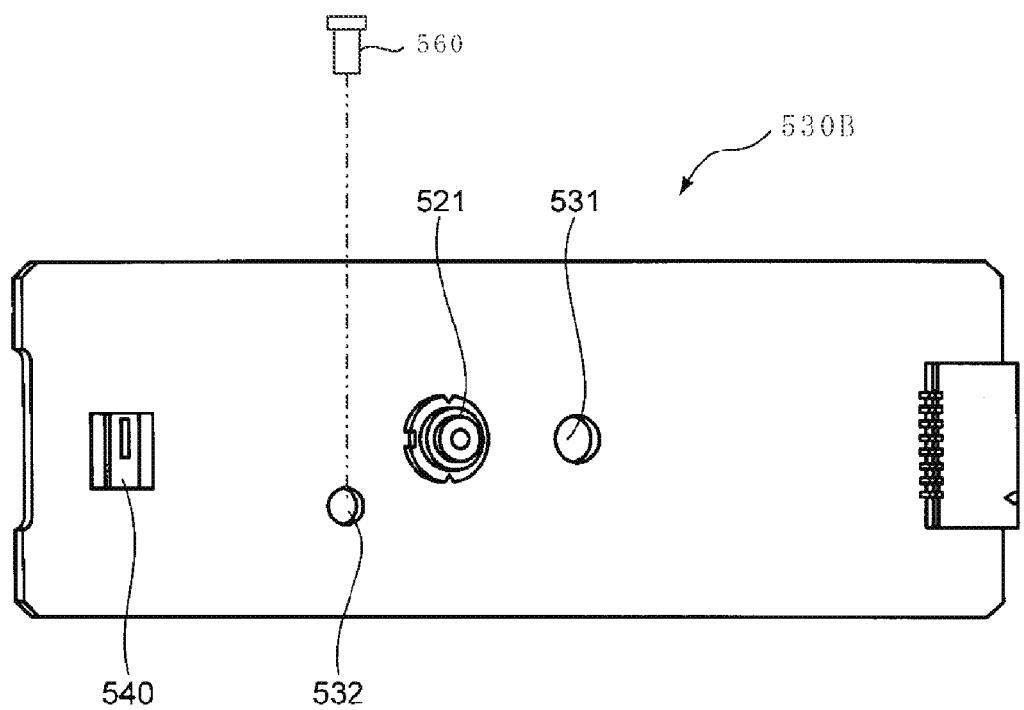
FIG. 16 is a schematic diagram of a control board that is to be attached to the holding plate shown in FIG. 14.

FIG. 15 is a schematic plan view of the holding plate 514C. FIG. 16 is a schematic diagram of the control board 530B that is to be attached to the holding plate 514C. The holding plate 514C will be described below with reference to FIGS. 15 and 16.

The holding plate 514C includes the boss 554. The boss 554 is inserted into the first through hole 531 formed in the control board 530B.

Unlike the second embodiment of a restricting mechanism, the laser light source 521 is mounted to the control board 530B before being connected to the holding plate 514C. Similarly to the second embodiment, the light receiving element 540 is mounted to the control board 530B.

Figure 17:
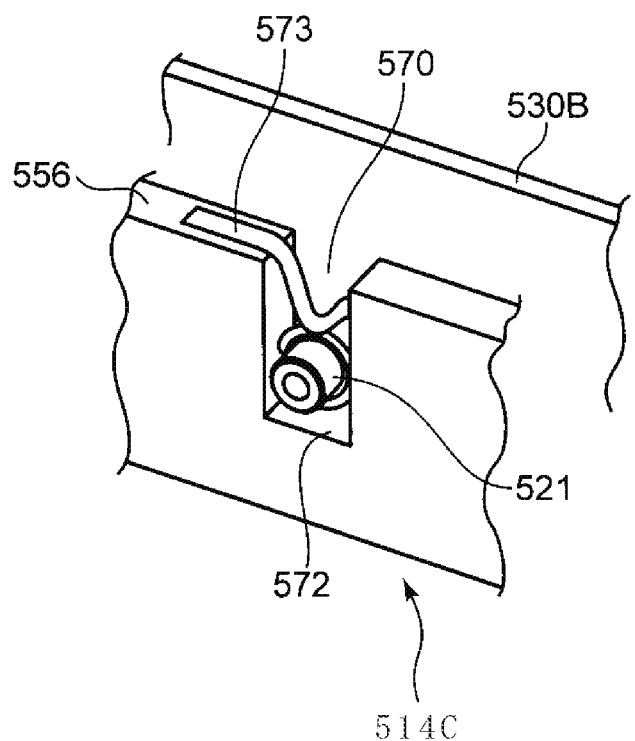
FIG. 17 is a schematic enlarged perspective view of the holding plate shown in FIG. 14.

FIG. 17 is a schematic enlarged perspective view of the holding plate 514C in the periphery of the notch portion 570. The holding plate 514C will be described below with reference to FIGS. 15 to 17.

After the boss 554 is inserted into the first through hole 531 of the control board 530B, when the control board 530B is rotated downward about the boss 554, the light receiving element 540 mounted to the control board 530B is inserted into the notch portion 555. Also, the laser light source 521 mounted to the control board 530B is inserted into the notch portion 570. In other words, the notch portion 570 is formed such that the laser light source 521 is inserted into the notch portion 570 when the control board 530B is rotated about the boss 554. Accordingly, the holding plate 514C and the control board 530B are connected in a simple manner. The control board 530B is rotated downward about the boss 554 until the light receiving element 540 comes into contact with the horizontal face 558. The depth of the notch portion 570 is set such that the laser light source 521 comes into contact with the horizontal face 572 of the notch portion 570 when the light receiving element 540 comes into contact with the horizontal face 558. In other words, the control board 530B is connected to the holding plate 514C such that the laser light source 521 mounted to the control board 530B comes into contact with the horizontal face 572. Accordingly, the laser light source 521 is appropriately positioned. In the present embodiment, the horizontal face 572 is given as an example of a second contact face.

Note that as long as the configuration is such that the laser light source 521 is positioned by coming into contact with the horizontal face 572 when the control board 530B is connected to the holding plate 514C, the method of connection is not limited to the control board 530B being rotated about the boss 554. In other words, the configuration needs only be such that the reference for the fixing position of the laser light source 521 is determined by the horizontal face 572 when the control board 530B and the holding plate 514C are connected. For example, a configuration is conceivable in which the notch portion 570 is formed such that the laser light source 521 is inserted into the notch portion 570 when the control board 530B and the holding plate 514C are moved relative to each other in directions according to which the boss 554 is inserted into the first through hole 531.

After the laser light source 521 comes into contact with the horizontal face 572, a flat spring 573 is attached to the upper edge 556 of the holding plate 514C. The flat spring 573 comes into contact with the laser light source 521 in the notch portion 570. As a result, the laser light source 521 is pressed against the horizontal face 572 by the flat spring 573. Accordingly, the laser light source 521 is stably held in the notch portion 570 and appropriately fixed. In the present embodiment, the flat spring 573 is given as an example of a second pressing portion. Alternatively, another appropriate member for pressing the laser light source 521 against the horizontal face 572 may be used as the second pressing portion.

After the flat spring 573 is attached, the control board 530B is appropriately fixed to the holding plate 514C using an appropriate fixture 560 that has been inserted into the second through hole 532 of the control board 530B. As a result, rotation of the control board 530B about the boss 554 relative to the holding plate 514C is limited. This suppresses separation of the light receiving element 540 from the movement plane MP.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An optical scanning apparatus comprising:
a reflecting mechanism that reflects a light beam such that an irradiation point of the light beam moves in a predetermined scanning direction;
a light receiving element that is arranged in a movement plane defined by the light beam reflected by the reflecting mechanism, and that outputs a light reception signal for adjusting an irradiation timing of the light beam in accordance with reception of the light beam reflected by the reflecting mechanism;
a restricting mechanism that positions the light receiving element relative to the movement plane;
a light source that emits the light beam; and
a control board that controls the light source in accordance with the light reception signal,
wherein the restricting mechanism includes a holding plate, the holding plate having a holding portion that holds the light source, and a first notch face that defines a first notch portion that crosses the movement plane,
the light receiving element is mounted to the control board,
the control board is connected to the holding plate such that the light receiving element comes into contact with the first notch face,
a through hole is formed in the control board,
the holding plate includes a boss that is inserted into the through hole formed in the control board, and
the first notch portion is formed such that the light receiving element is inserted into the first notch portion when the control board is rotated about the boss.

2. The optical scanning apparatus according to claim 1, wherein the first notch face includes a pair of first intersecting faces that intersect the movement plane, and a first contact face that comes into contact with the light receiving element between the pair of first intersecting faces, and
the restricting mechanism includes a first pressing portion that presses the light receiving element against the first contact face.

3. The optical scanning apparatus according to claim 1, further comprising:
a fixture that fixes the control board to the holding plate so as to limit rotation of the control board about the boss.

4. The optical scanning apparatus according to claim 1, further comprising:
a casing having an inner face that defines a housing space in which the reflecting mechanism is housed, and an outer face on the opposite side of the inner face,
wherein the control board is arranged opposing the outer face, and
the casing includes the holding plate.

5. An image forming apparatus comprising:
an optical scanning apparatus,
wherein the optical scanning apparatus comprises:
a reflecting mechanism that reflects a light beam such that an irradiation point of the light beam moves in a predetermined scanning direction;
a light receiving element that is arranged in a movement plane defined by the light beam reflected by the reflecting mechanism, and that outputs a light reception signal for adjusting an irradiation timing of the light beam in accordance with reception of the light beam reflected by the reflecting mechanism;
a restricting mechanism that positions the light receiving element relative to the movement plane;
a light source that emits the light beam; and
a control board that controls the light source in accordance with the light reception signal,
wherein the restricting mechanism includes a holding plate, the holding plate having a holding portion that holds the light source, and a first notch face that defines a first notch portion that crosses the movement plane,
the light receiving element is mounted to the control board,
the control board is connected to the holding plate such that the light receiving element comes into contact with the first notch face,
a through hole is formed in the control board, the holding plate includes a boss that is inserted into the through hole formed in the control board, and the first notch portion is formed such that the light receiving element is inserted into the first notch portion when the control board is rotated about the boss.

6. The image forming apparatus according to claim 5, wherein the optical scanning apparatus further comprises:

a fixture that fixes the control board to the holding plate so as to limit rotation of the control board about the boss.

* * * * *

UNITED STATES PATENT AND TRADEMARK OFFICE
CERTIFICATE OF CORRECTION

PATENT NO. : 8,736,654 B2
APPLICATION NO. : 13/754648
DATED : May 27, 2014
INVENTOR(S) : Issei Nakano and Hiroaki Tsuchiya It is certified that error appears in the above-identified patent and that said Letters Patent is hereby corrected as shown below:

In the Claims:

In the Column 14, at line 54, delete "light" between "a" and "source" and replace with --light--.

In the Column 14, at line 54, delete "light" between "the" and "beam;" and replace with --light--.

Signed and Sealed this
Ninth Day of September, 2014

Michelle K. Lee
*Deputy Director of the United States Patent and Trademark Office*